Feb. 12, 1946. W. ISLER 2,394,692
METHOD OF TRANSFERRING LOADS TO INDUSTRIAL TRUCKS
Filed Oct. 27, 1943 3 Sheets-Sheet 1

INVENTOR.
WILLIAM ISLER.

Feb. 12, 1946. W. ISLER 2,394,692
METHOD OF TRANSFERRING LOADS TO INDUSTRIAL TRUCKS
Filed Oct. 27, 1943 3 Sheets-Sheet 2
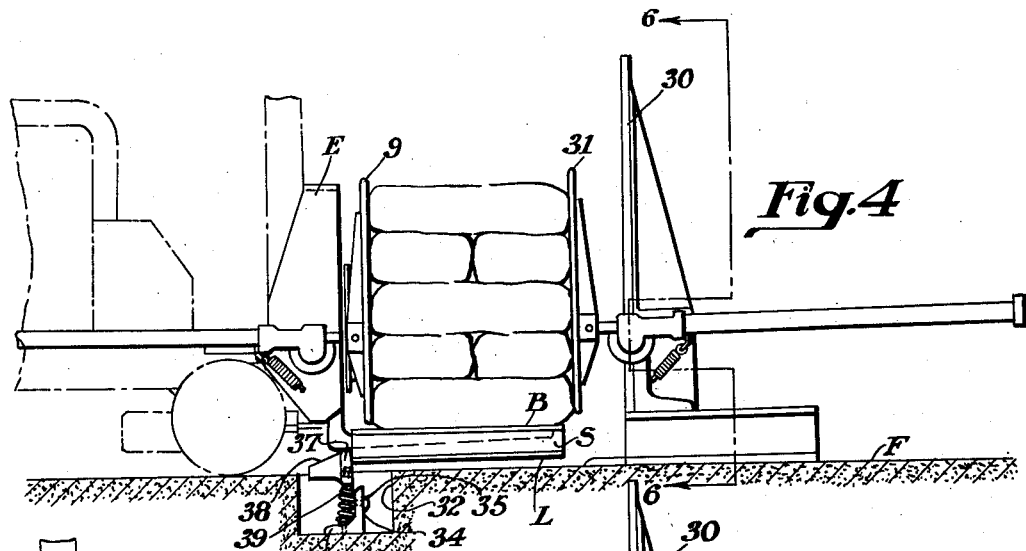
Fig. 4
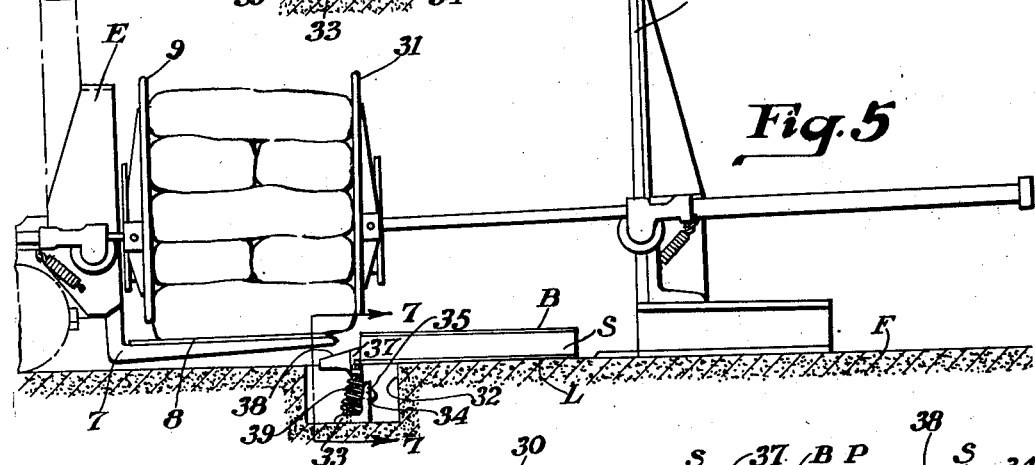
Fig. 5
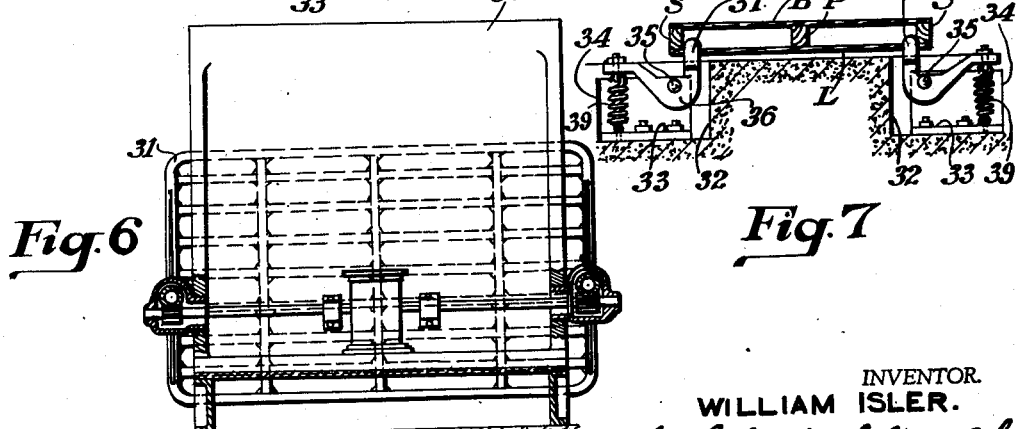
Fig. 6
Fig. 7
INVENTOR.
WILLIAM ISLER.
BY
Attorneys

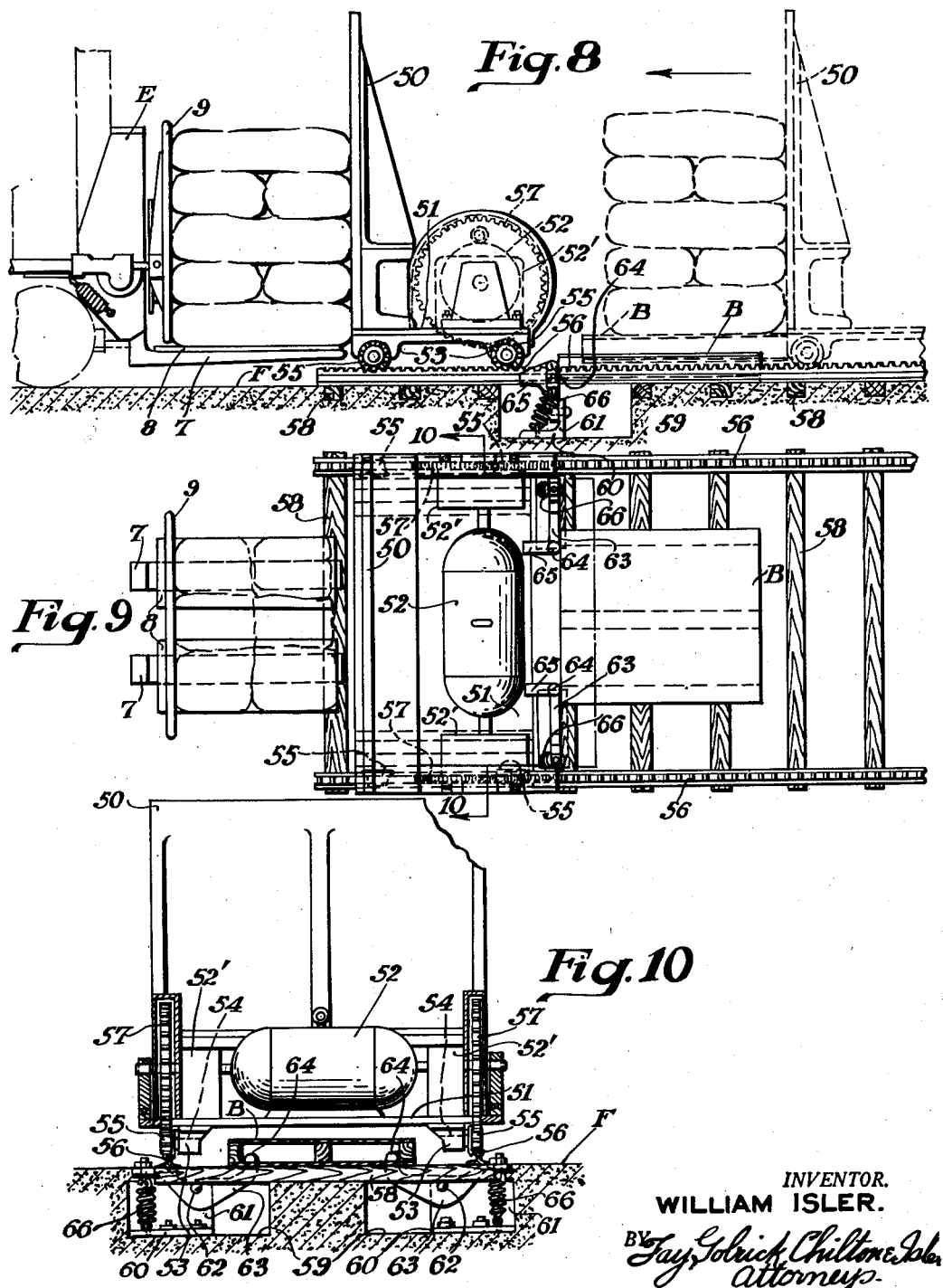

Patented Feb. 12, 1946

2,394,692

UNITED STATES PATENT OFFICE 2,394,692

METHOD OF TRANSFERRING LOADS TO INDUSTRIAL TRUCKS

William Isler, Cleveland Heights, Ohio

Application October 27, 1943, Serial No. 507,792

5 Claims. (Cl. 214—152)

This invention relates, as indicated, to methods of and apparatus for transferring loads from pallets to industrial trucks.

In the handling of loaded pallets or skids by means of industrial lift trucks and the like, it frequently becomes necessary, particularly in connection with loads such as piles or stacks of bags filled with bulk materials, i. e. flour, cement, etc., to transfer the loads from the pallets or skids to the elevator of the truck, in order to permit the load, minus the pallet, to be deposited on the floor of a freight car or upon a previously deposited load in the freight car.

Various methods and means have been proposed for accomplishing this, but in each case, mechanism or means for holding the pallet or skid while stripping the load therefrom was incorporated in the truck and pallets of special construction were designed for use in connection with such holding or retaining mechanism. These expedients were not always satisfactory, since the incorporation of such retaining means in the truck required space therefor where space was at a premium, and the mechanism was so located as to make access thereto for repair or replacement somewhat difficult. Moreover, the pallets, since they were especially designed for use in connection with such mechanism were, in some instances, limited in their field of usefulness.

The present invention has as its primary object the provision of methods and means for facilitating the transfer of loads of the character described from pallets to industrial trucks, and which do not require the use of pallet retaining or holding mechanism on the truck itself, or pallets of special construction.

Other objects and advantages of the invention will be apparent during the course of the following description.

In the accompanying drawings, forming a part of this specification, and in which like numerals are employed to designate like parts throughout the same:

Fig. 4 is a view similar to Fig. 1, but showing a modification of the invention;

Fig. 5 is a view similar to Fig. 1, but showing the load as stripped from the pallet;

Fig. 6 is a view, partly in section and partly in elevation, taken on the line 6—6 of Fig. 4;

Fig. 7 is a cross-sectional view, taken on the line 7—7 of Fig. 5;

Fig. 8 is a view similar to Figs. 1 and 4, but showing another modification of the invention;

Fig. 9 is a plan view of portions of Fig. 8, and

Fig. 10 is a cross-sectional view, taken on the line 10—10 of Fig. 9.

Figure 1:
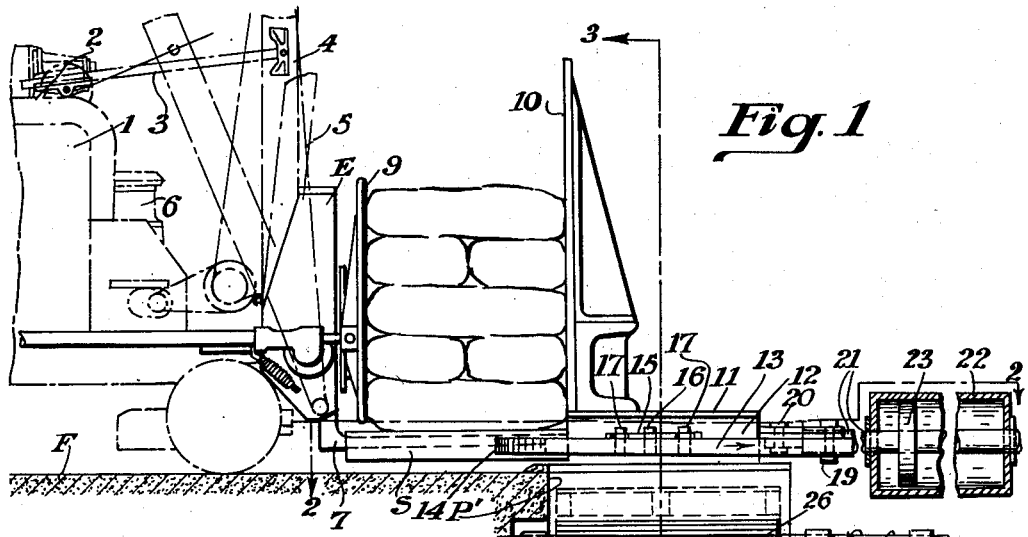
Fig. 1 is a view, illustrating more or less diagrammatically, one method and means for accomplishing the objects of the invention.
Figure 2:
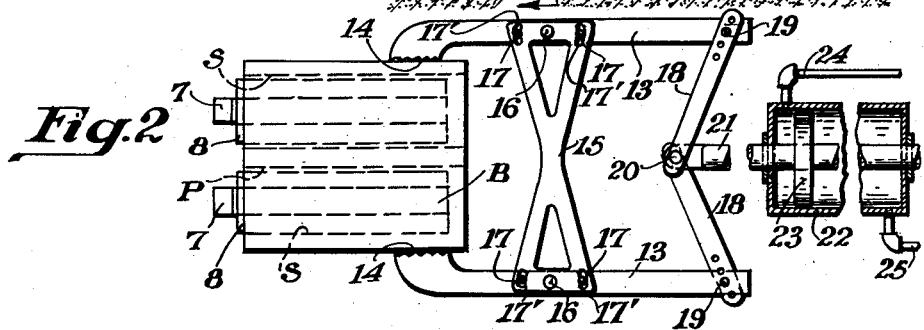
Fig. 2 is a plan view, as indicated by the line 2—2 of Fig. 1.
Figure 3:
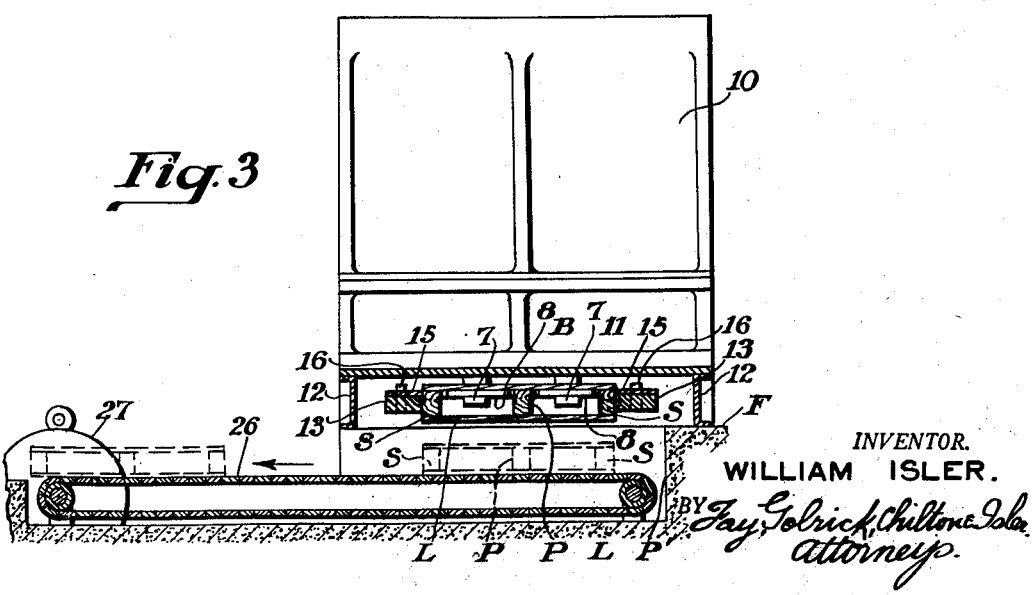
Fig. 3 is a cross-sectional view, taken on the line 3—3 of Fig. 1.

Referring to Figs. 1, 2 and 3 of the drawings, it will be seen that an industrial truck, such as is best adapted for use in conjunction with the novel features of the present invention, generally comprises a battery 1 which is used to furnish power for a motor 2, which, through racks 3, functions to tilt a frame 4 to various positions, as indicated in Fig. 1. The frame comprises spaced channels having filler strips which serve as tracks or guides for the wheels of a vertically reciprocable elevator, generally designated E.

The elevator is propelled up or down along the frame 4 by means of a cable or chain 5, the ends of which are attached in any suitable manner to the elevator E, such chains or cables being driven by a motor 6, which derives its motive power from the battery 1.

The elevator E is provided with a pair of laterally spaced forks 7 which in this instance, have plates 8 secured to the upper surfaces thereof, the combined width of these plates being substantially equivalent to the width of the ordinary load-supporting skid or pallet which trucks of this character are designed to transport.

Such skids or pallets generally consist of an upper board B, a lower board L, sides S, and a central longitudinally extending vertically disposed partition P, all of these parts usually formed of wood or like material. For the purposes of the present invention, the upper board B will be covered with a smooth sheet of metal or other material upon which a load may be easily slid.

The truck further includes a pusher or screen 9, which is mounted on the elevator E and is reciprocable relatively to such elevator, being substantially coextensive in width with the elevator. The construction of this pusher and the mechanism for reciprocating the same relatively to the elevator are fully described in the copending application of Henry F. Wilms, Serial No. 499,942, and need not therefore be here described.

The truck is designed primarily for the lifting and transporting of loaded pallets, as shown in Fig. 1. Should the operator, after he has transported the load to the desired position, wish to leave the skid with the load, he will merely deposit the skid on the floor or on a previously deposited load, and back the truck away, the friction of the skid relatively to the floor or to the top of the previously deposited load serving to permit this without necessitating the use of the pusher 9.

Should the operator, however, wish to transport the load into a freight car, it is desirable that the load be deposited without the pallet. For the purpose of facilitating the transfer of a load, such as a pile of bags (Fig. 1), under such conditions, means have been provided for first transferring the load from the skid or pallet to the forks of the elevator. Such means comprises a stationary abutment 10, which is of somewhat greater width than the pusher 9, and is mounted on a hollow frame or enclosure consisting of a top 11 and sides 12, such enclosure being anchored to the floor F (which may be the floor of the warehouse) in any suitable manner.

Extending through the enclosure 11—12 in laterally-spaced relation is a pair of gripper bars or clamps 13 having serrated gripping or clamping faces 14. These bars are maintained (in laterally-spaced relation) by means of a rigid cross member 15, the ends of which are pivoted, as at 16, to the bars, and are maintained against relative longitudinal movement with respect to each other by means of pins 17, which extend upward from the bars 13 and into arcuate slots 17' in the ends of the member 15.

The gripping faces 14 of the bars 13 are adapted to be brought into engagement with the sides S of a skid by pivotal movement of the bars 13 about the pins 16, this being effected by a pair of toggle links 18, the outer ends of which are secured to the ends of the bars 13, as by pins 19, and the inner ends of which are secured to each other as by a pin 20. Secured to the pin 20 is a plunger 21 which extends into a cylinder 22, and is provided, within the cylinder, with a piston head 23. By admitting air or oil into one end of the cylinder 22 as through a conduit 24, the plunger 21 is moved to the right (Fig. 2), thereby bringing the faces 14 into gripping engagement with the sides of the skid. By admitting air or oil into the opposite end of the cylinder 22, as through a conduit 25, the plunger 21 is moved to the left, thereby causing the gripping faces 14 to be released from the sides of the skid.

Mechanism has also been provided for removing the empty pallets from the enclosure 11—12. For this purpose, the enclosure is disposed directly above one end of a pit or recess P' in the floor, this pit extending at right angles to the enclosure, and having disposed therein an endless conveyor 26, driven by a motor 27.

The use of the aforesaid mechanism and means will now be described.

With the pusher 9 in its retracted position, as shown in Fig. 1, the operator will pick up the skid or pallet bearing the load, and move the truck so as to bring the load into engagement with the abutment 10. Thereafter, the plunger 21 will be actuated so as to bring the faces 14 of the clamping bars 13 into engagement with the sides S of the pallet. Continued movement of the plunger 21, will then cause the pallet to be pulled within the enclosure 11—12, thereby, in effect, stripping the pallet from the forks 7 and from the load, and permitting the load to drop by gravity onto the plates 8 of the forks.

Upon movement of the plunger 21 to the left, the empty pallet will be released by the jaws 14 and will fall onto the conveyor 26, and be carried by such conveyor in the direction indicated by the arrow in Fig. 3, and to a position in which it may be picked up and removed to a stack of empty pallets.

The operator can then move the load into a freight car, and, by means of the pusher 9, strip the load from the plates 8, and deposit the load on the floor of the car or on a previously deposited load.

In that form of the invention, shown in Figs. 4, 5, 6 and 7, a stanchion 30, similar to the abutment 10, is provided, and has mounted thereon a pusher 31, which is similar in construction, and is adapted to be actuated in precisely the same manner as the pusher 9 on the truck, that is to say, the pusher 31 may be reciprocated relatively to the stanchion 30, which is anchored to the floor F of the warehouse.

The floor F has laterally-spaced recesses 32 therein, disposed in advance of the stanchion 30, and rigidly secured to the floor of each of the recesses 32 is a plate 33 having an upright flange 34. Pivotally secured to each of the flanges 34, as at 35, is a member 36 having stops 37 which are sloped as at 38 in the direction of movement of the truck. These stops are normally maintained above the level of the floor F by means of coil springs 39 which are secured to the other ends of members 36 and to the plates 33.

In operation, the truck carrying the loaded pallet is moved toward the stanchion 30, so as to bring the load into engagement with the pusher 31. The pallet during this movement engages the stops 37 depressing the latter against the tension of the springs 39, thereby permitting the pallet to pass over the stops. When the pallet reaches the position shown in Fig. 4, the pallet has cleared the stops 37, and the springs 39 cause the stops to be elevated to the position shown.

Thereafter, the truck is backed away from the stanchion 30, as shown in Fig. 5, and at the same time, the pusher 31 is moved at the same speed as the truck to the position shown in Fig. 5. Since the pallet is retained by the stops 37 from moving from the position shown in Fig. 4, the result will be to strip the load from the pallet as shown in Fig. 5, causing it to be transferred to the plates 8 of the forks 7.

The load may then be moved into a freight car and, by means of the pusher 9, stripped from the plates 8 and deposited upon the floor of the freight car or on a previously deposited load.

In that form of the invention shown in Figs. 8, 9 and 10, an abutment 50 is provided, which is mounted on a base or support 51, which carries an electric motor 52. The base 51 is provided adjacent its side edges with depending bearing members 53 in which are journalled stub shafts 54 provided at their outboard ends with pinions 55 which mesh with tracks in the form of racks 56, the bases of which are disposed substantially flush with the level of the floor F.

The abutment 50 is adapted to be propelled along the tracks 56 by means of bull gears 57 which are driven by the motor 52, through reducing gear units 52' and which are in mesh with the pinions 55.

The tracks 56 are mounted on ties 58 and, for a portion of their length are disposed alongside pits or recesses 59 in the floor F.

Rigidly secured to the floor of the recesses 59 are plates 60 having upright flanges 61 to which are pivotally secured as at 62, members 63 having stops 64 which are sloped as at 65 in the direction of movement of the abutment 50. These stops 64 are normally maintained above the level of the ties 58 by means of coil springs 66 which are secured to the other ends of the members 63 and to the plate 60.

In operation, the truck carrying the loaded pallet is moved to the position indicated in dotted lines in Fig. 8, that is to say, into engagement with the abutment 50 which initially occupies this position. Incidental to this movement, the stops 64 are depressed against the tension of the springs 66 by the engagement of the skid with the sloped surfaces 65 of the stops thereby permitting the skid to pass the stops. When the skid has passed the stops, they are again elevated to the position shown in Fig. 8, due to the action of the springs.

The abutment and the truck are then simultaneously moved in the direction indicated by the arrow in Fig. 8 and to the position shown in solid lines in such figure. As this movement begins, the skid is stopped by the stops 64. Thereafter, the load is stripped from the skid by the abutment 50 and is transferred directly onto the plates 8 of the forks 7, permitting the operator to move the load into a freight car and, by means of the pusher 9, to strip the load from the plates 8 and deposit the same on the floor of a freight car or on a previously deposited load.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. The method of transferring a load from a loaded skid on an industrial truck to the load-supporting portion of said industrial truck, which consists in moving the load against an abutment, and then, while the load remains in such engagement, depositing the load upon said load-supporting portion of the truck by pulling the skid from under the load.

2. The method of transferring a load from a loaded skid on an industrial truck to the load-supporting portion of said industrial truck, which consists in moving the load against a stationary abutment, and then pulling the skid from under the load to cause the load to gravitate to said load-supporting portion of the truck.

3. The method of transferring a load from a loaded skid on an industrial truck to the load-supporting portion of said industrial truck, which consists in moving the load against a movable abutment, and then stripping the load from the skid by movement of the abutment relatively to the skid, thereby causing the load to gravitate to said load-supporting portion of said truck.

4. The method of transferring a load from a loaded skid to the load-supporting portion of an industrial truck, which consists in moving the load against a movable abutment, and then, while maintaining the skid stationary, moving the truck and abutment so as to strip the load from the skid and cause it to be deposited directly upon said load-supporting portion of the truck.

5. The method of transferring a load from a loaded skid to the load-supporting portion of an industrial truck, which consists in moving the load into engagement with an abutment by means of said truck, the loaded skid being carried by the load-supporting portion of the truck, and then, while the load is maintained against said abutment, pulling the skid from under the load by means independent of said truck, to thereby strip the skid from the load and cause the load to gravitate to said load-supporting portion of the truck.

WILLIAM ISLER.